(12) United States Patent
Richey et al.

(10) Patent No.: US 9,586,570 B2
(45) Date of Patent: Mar. 7, 2017

(54) METHODS AND SYSTEM FOR VERIFYING A BRAKE SYSTEM IN A VEHICLE

(71) Applicant: SIEMENS INDUSTRY, INC., Alpharetta, GA (US)

(72) Inventors: Kimberly Richey, Lilburn, GA (US); Xiaobin Wang, Cumming, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 3 days.

(21) Appl. No.: 14/605,245

(22) Filed: Jan. 26, 2015

(65) Prior Publication Data

US 2016/0214594 A1    Jul. 28, 2016

(51) Int. Cl.
*B60T 17/22* (2006.01)
*B60T 8/88* (2006.01)

(52) U.S. Cl.
CPC ............ *B60T 17/221* (2013.01); *B60T 8/885* (2013.01); *B60T 2270/406* (2013.01)

(58) Field of Classification Search
None
See application file for complete search history.

(56) References Cited

U.S. PATENT DOCUMENTS

| | | |
|---|---|---|
| 8,311,699 B2 | 11/2012 | Brown et al. |
| 2010/0079301 A1 | 4/2010 | Rossaert |
| 2011/0022248 A1* | 1/2011 | McQuade ............. G06Q 10/06 701/2 |
| 2012/0209481 A1 | 8/2012 | Rindfleisch et al. |
| 2012/0221195 A1* | 8/2012 | Eliasson ................ B60T 17/22 701/33.4 |
| 2014/0168827 A1* | 6/2014 | Mirzaei ................ H02H 3/253 361/31 |

FOREIGN PATENT DOCUMENTS

| | | |
|---|---|---|
| EP | 2495145 A1 | 9/2012 |
| GB | 2515869 A | 1/2015 |
| WO | 2010123412 A1 | 10/2010 |

OTHER PUBLICATIONS

PCT International Search Report and Written Opinion mailed Jul. 27, 2016 corresponding to PCT Application No. PCT/US2015/061222 filed Nov. 18, 2015 (11 pages).

* cited by examiner

*Primary Examiner* — Thomas Tarcza
*Assistant Examiner* — Garrett Evans

(57) ABSTRACT

A method for checking sets of components of a vehicle includes configuring a system control unit of a vehicle to perform a check of a first set of components and a second set of components of the vehicle, the first set of components being different from the second set of components. The first set of components is automatically checked using the system control unit. The second set of components is optionally checked using the system control unit, wherein the control unit is configured to disable the check of the second set of components based upon a disable command provided to the control system. Further, a system for verifying different sets of components and a further method for checking sets of components of a vehicle are described.

20 Claims, 2 Drawing Sheets

METHODS AND SYSTEM FOR VERIFYING A BRAKE SYSTEM IN A VEHICLE

BACKGROUND

1. Field

Aspects of the present invention relate to methods for checking sets of components of a vehicle, for example in a mining haul truck, and a system for verifying different sets of components, in particular a service brake system, in a vehicle, for example in a mining haul truck.

2. Description of the Related Art

Off-highway vehicles used in the mining industry such as for example mining haul trucks, electric shovels, and draglines are designed with a brake system comprising different types of brakes. The brake system for haul trucks typically comprises of service brakes, parking brakes, and electric dynamic braking capabilities, for example an electric dynamic retarder. The service brakes are part of a service brake system which can comprise of hydraulically or mechanically operated service friction brakes. More specifically, the service brake system can be for example an all-hydraulic actuated braking system including for example oil-cooled, hydraulic actuated, multiple disc brakes at each wheel of the vehicle.

The service brake system is typically applied at low speeds of a vehicle, for example a mining haul truck, wherein the electric dynamic retarder is applied at higher speeds of the vehicle. But the service brake system including all multiple disc brakes must be available to decelerate the vehicle at the higher speeds when the electric dynamic retarder is unavailable. Using the service brake system under high speed conditions causes breakdown of brake discs or brake pads and over time can degrade the effectiveness of the service brake system which may cause unsafe operating conditions. After using the service brake system under high speed applications, operators do not have a possibility to check the effectiveness of the service brake system other than testing the service brake system while the vehicle is in motion. For example, the operators can move and apply the service brake system in order to gauge how effective the brakes are, but such a test is a subjective test. Also, the brake discs or brake pads could be visually inspected.

U.S. Pat. No. 8,311,699 describes methods for testing a braking device in off-highway vehicles. For example, a method for checking a service brake system without moving a vehicle which requires multiple input of an operator of the vehicle is described. Thus, a need still exists for an improved method and systems for verifying a brake system in a vehicle, and more particularly a service brake system in a vehicle, for example in a mining haul truck.

SUMMARY

Briefly described, aspects of the present invention relate to methods for checking sets of components of a vehicle, for example an off-highway vehicle, and a system for verifying different sets of components, in particular a service brake system, in an off-highway vehicle, the vehicle being for example a mining haul truck, in particular a dump truck.

A first aspect of the present invention provides a method for checking sets of components of a vehicle. The method comprises configuring a system control unit of a vehicle to perform a check of a first set of components and a second set of components of the vehicle, the first set of components being different from the second set of components; automatically checking the first set of components using the system control unit; and automatically checking the second set of components using the system control unit, unless the control unit is configured to disable the check of the second set of components based upon a disable command provided to the control system.

A second aspect of the present invention provides a system for verifying different sets of components in a vehicle. A system control unit is configured to perform a check of a first set of components and a second set of components of the vehicle, the first set of components being different from the second set of components. At least one deactivation element is operably connected to the system control unit to disable the check of the second set of components, wherein the first set of components is automatically checked using the system control unit, and wherein the second set of components is automatically checked unless optionally disabled via the at least one deactivation element.

A third aspect of the present invention provides a further method for checking sets of components of a vehicle. The method comprises configuring a system control unit of a vehicle to perform a check of a first set of components and a second set of components of the vehicle, the first set of components being different from the second set of components; automatically checking the first set of components using the system control unit; issuing a test command by an operator to the system control unit to perform a check of the second set of components of the vehicle; and checking the second set of components of the vehicle in response to the test command using the system control unit.

DETAILED DESCRIPTION

To facilitate an understanding of embodiments, principles, and features of the present invention, they are explained hereinafter with reference to implementation in illustrative embodiments. In particular, they are described in the context of being methods and a system for verifying different components including a service brake system in mining applications. Embodiments of the present invention, however, are not limited to use in the described methods or system.

The components and materials described hereinafter as making up the various embodiments are intended to be illustrative and not restrictive. Many suitable components and materials that would perform the same or a similar function as the materials described herein are intended to be embraced within the scope of embodiments of the present invention.

In the description below, a vehicle, for example a mining haul truck or a dump truck is used as an example of electrically powered mining equipment. One skilled in the art, however, can develop embodiments of the invention for other electrically powered mining vehicles, such as for example front loaders.

Figure 1:
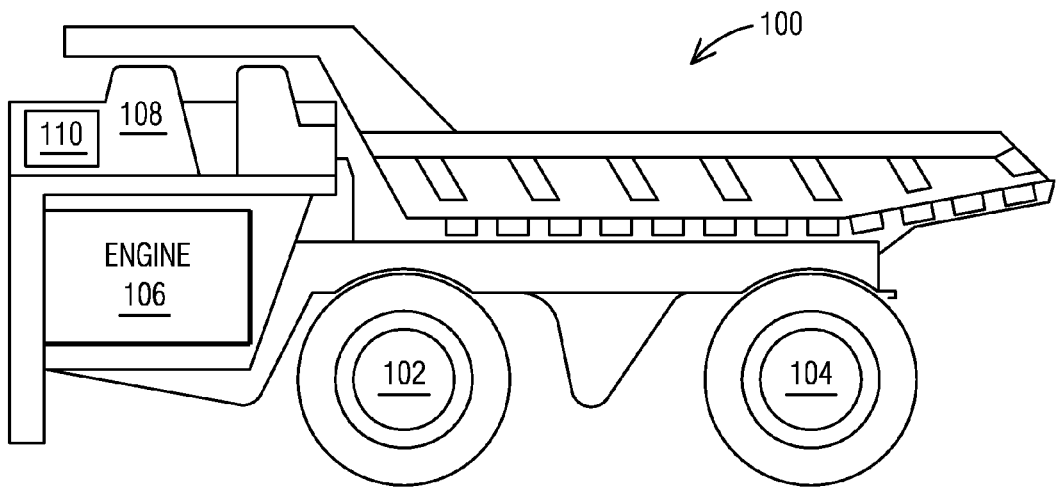
FIG. 1 shows a representation of a side view of a known vehicle, for example a mining haul truck or a dump truck, including components of a power system, in accordance with an exemplary embodiment of the present invention.

FIG. 1 shows a representation of a side view of a known vehicle 100, for example a mining haul truck or a dump truck.

The vehicle 100, which can be for example a mining haul truck and in some embodiments, more specifically a dump truck, has at least two axles and up to four drive wheels, and can have, for example and not limiting, approximately a 360-metric ton payload capacity. In drive mode, also referred to as the propel mode, each wheel is driven by a 3-phase alternating-current (AC) wheel motor (M), each motor coupled to a wheel of the mining haul truck. FIG. 1 shows electric wheel motors 102 and 104. The other two electric wheel motors are opposite the wheel motors 102 and 104 on the other side of the truck 100. Electrical power is supplied by at least one diesel engine 106 driving at least one 3-phase AC generator, also referred to as alternator. Other types of engines can be used, but diesel engines are typical in mining operations. The at least one diesel engine 106 and the at least one alternator are mounted on the mining haul truck 100.

An AC output of the at least one alternator is connected to rectifiers. Direct current (DC) output of the rectifiers is then connected to a DC bus. Inverter(s) draw DC power from the DC bus and supply 3-phase AC power to all wheel motors for at least two wheels of the truck 100, wherein FIG. 1 shows only two wheel motors 102 and 104.

The truck 100 further comprises a brake system comprising of different types of brakes. The brake system typically comprises of service brakes, parking brakes, and electric dynamic braking capabilities, for example an electric dynamic retarder. To slow down a moving mining haul truck, the mining haul truck drive system operates in retard mode, also referred to as braking mode, using the electric dynamic retarder. Under normal operation, an electrical motor converts electrical energy into mechanical energy. An electrical motor can also be operated in reverse as a generator to convert mechanical energy into electrical energy. The electrical energy is then fed into inverters. Braking choppers, connected to the inverters, channel the power into a power resistor grid that continuously dissipates the energy until the mining haul truck reaches standstill. Braking is smooth, without mechanical brake wear. Braking choppers and a power resistor grid dissipate energy from the wheel motors 102 and 104 during braking action, i.e. provide the braking action for the wheel motors 102 and 104. A service brake system comprising for example hydraulically or mechanically operated service friction brakes is typically applied at low speeds of the vehicle. More specifically, the service brake system can be for example an all-hydraulic actuated braking system including for example oil-cooled, hydraulic actuated, multiple disc brakes at each wheel of the vehicle 100. Low speeds include for example speeds greater than 0 mph and up to 5 mph.

The truck 100 further comprises an operator cab 108 which houses, among other things, a plurality of control devices, for example a system control unit 110 used to control propel, speed and retard operations of the wheel motors 102 and 104 based on operator commands. The system control unit 110 can comprise of one or more controllers, one or more memory devices and one or more interfaces. Functionalities of the one or more controllers may be implemented in software and/or hardware. The one or more controllers may be a microprocessor controller, a programmable logic controller, a mainframe computer, or other similar processors that may be used to control the operation of the wheel motors 102 and 104. The system control unit 110 further comprises and/or is coupled to a communication panel configured as a Human-Machine-Interface (HMI) device. The communication panel can include a diagnostic panel, including a type of display, used to display system information for gages, warning lights, switches, connectors etc. The communication panel may communicate via CAN network, also referred to as CAN bus, with other components and/or devices of the truck 100. The CAN bus mounted on the truck 100 allows components and devices to communicate with each other within the vehicle 100.

Figure 2:
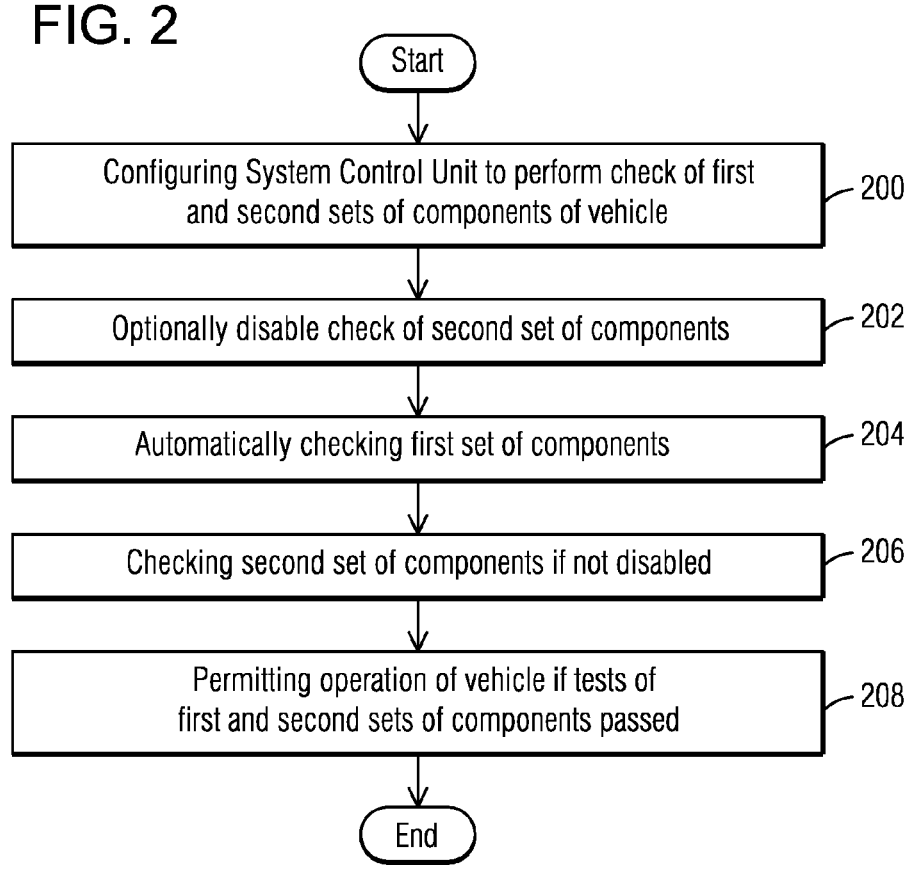
FIG. 2 shows a flowchart illustrating a method for verifying different sets of components of a vehicle, for example a mining haul truck, in accordance with an exemplary embodiment of the present invention.

FIG. 2 shows a flowchart illustrating a method for verifying different sets of components of a vehicle, for example a mining haul truck, in accordance with an exemplary embodiment of the present invention.

Before a vehicle, for example the mining haul truck 100 as shown in FIG. 1, may be operated, a component and system check is performed. Such a component and system check is typically performed before an operator of the vehicle is allowed to operate the vehicle, for example in drive mode. Within the system and component check, different sets of components are checked, which means tested and/or verified and/or inspected for accuracy and/or quality.

At block 200, the system control unit 110 of the vehicle 100 is configured to perform a check of a first set of components and a second set of components of the vehicle, the first set of components being different from the second set of components. At block 202, the check of the second set of components may optionally be disabled. For example, an operator of the vehicle 100 may disable the check via a disable command to the system control unit 110. At block 204, the first set of components is automatically checked using the system control unit 110. At block 206, the second set of components is also checked using the system control unit 110 if not disabled by the operator. Specifically, the system control unit 110 performs the check of the second set of components automatically unless the check is disabled.

If the check of the second set of components is disabled, the check will not be performed and only the check of the first set of components is performed using the system control unit 110. If the tests of the first and second sets of the components, or only the first set of components, have been successful, the vehicle 100 is permitted to propel (block 208). A test of a set of components is successful when, during the test, it has been determined that the components are operational and perform functions as per their definitions.

The first set of components of the vehicle 100 comprises components of a drive system of the vehicle 100, such as for example electrical and electronic components, for example inverter modules, trolley components, cooling system components etc. Those of ordinary skill in the art would appreciate that many other components of the vehicle 100 may be included in the first set of components. The components of the first set are components which are usually tested in order to determine whether the drive system of the vehicle 100 is ready for propel mode, i.e. the vehicle 100 is ready for operation.

The second set of components comprises at least one service brake of the vehicle 100. For example, the second set of components comprises a plurality of services brakes. A service brake is a mechanical device adapted to restrain a motion of a machine, in particular the vehicle 100. More specifically, the service brakes can be for example all-hydraulic actuated brakes including for example oil-cooled, hydraulic actuated, multiple disc brakes at each wheel of the vehicle 100. Those of ordinary skill in the art would appreciate that the service brakes may be mechanically and/or electrically operated.

Figure 3:
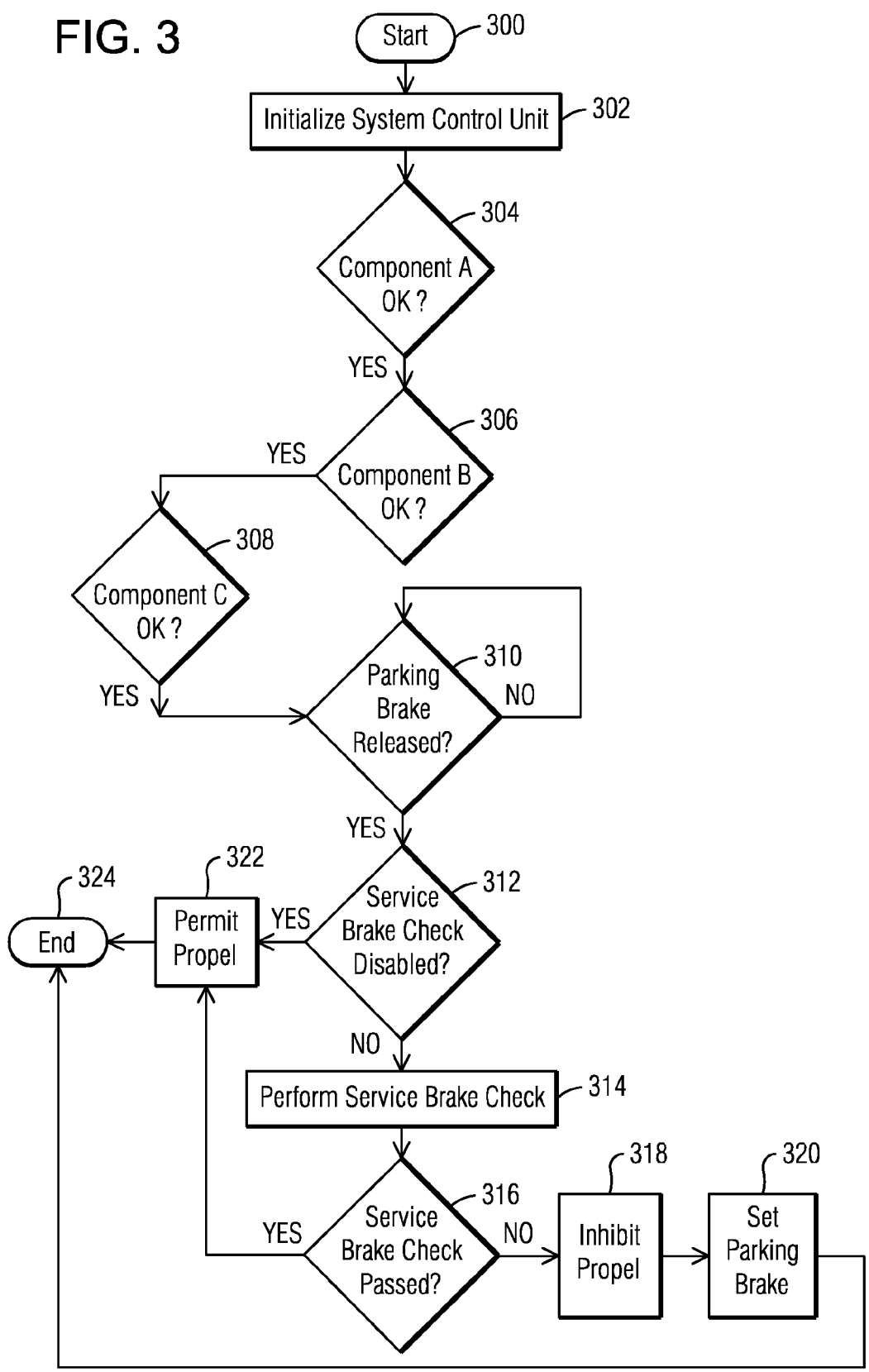
FIG. 3 shows a flowchart illustrating a method for verifying a service brake system, for example in a mining haul truck or a dump truck, in accordance with an exemplary embodiment of the present invention.

FIG. 3 shows a flowchart illustrating a detailed method for checking a plurality of components of a vehicle including a service brake system, for example in a mining haul truck or a dump truck as shown in FIG. 1, in accordance with an exemplary embodiment of the present invention.

Start 300 of the method comprises turning on ignition of the vehicle 100 (FIG. 1) including starting the engine 106. The system control unit 110 including the communication panel is activated automatically when the ignition is turned on. The described method is implemented as software running on the one or more controllers of the system control unit 110. At block 302, the system control unit 110 including the software is initialized. As described before, the system control unit 110 is configured to perform a check of different sets of components of the vehicle 100 including a service brake system and a drive system of the vehicle 100.

Service brakes are usually not tested within a system and component check of a vehicle before the vehicle is ready for operation. According to the proposed methods, checking of the service brake system is integrated into the component and system check of the vehicle, wherein the operator may choose whether a verification of the service brake system should be included as part of the component and system check or not.

If the operator of the vehicle 100 decides that a test of the service brake system of the vehicle 100 should be performed, a corresponding test process will be incorporated into the component and system check of the vehicle 100. According to an embodiment of the present invention, such a test process is automatically performed within the system and component check of the vehicle unless specifically disabled by the operator of the vehicle 100. Thus, the operator has the possibility to disable the test process of the service brake system. If no actions are taken by the operator, the test process will be automatically performed. The test process may be optionally disabled by the operator by issuing a disable command to the system control unit 110, such as via hardware and/or software deactivation element, or by other similar method. Thus, the vehicle 100 comprises at least one deactivation element to indicate that the verification of the service brake system should not be performed. Such a deactivation element is coupled to the system control unit 110 and can be for example configured as a pushbutton or switch. The pushbutton or switch is located in the operator cab 108, for example coupled to the communication panel and/or within a dashboard of the vehicle 100 so that the operator has easy access to the pushbutton or switch.

Alternatively, the operator of the vehicle 100 may be prompted to issue the disable command to the system control unit 110. For example, the deactivation element may be configured in form of software presented on the display of the communication panel after the system control unit 110 is activated and software initialized. For example, the communication panel may provide a question to the operator, for example "Disable Service Brake System Check?" along with icons "Yes" and "No", wherein the operator can select one of the icons "Yes" or "No". Those of ordinary skill in the art would appreciate that many other phrases or terms or icons may be used requesting input from the operator with regard to the verification of the service brake system. After selecting an icon, a command which represents the icon can be interpreted and, if the service brake system verification is disabled (deactivated), communicated to the system control unit 110.

In an alternative embodiment of the present invention, an activation element for activating the service brake system test may be provided instead of a deactivation element. The test process may be initiated by the operator by actively issuing a test command to the system control unit 110, such as via hardware and/or software activation element, or by other similar method. For example, the vehicle 100 may comprise at least one activation element to indicate that the verification of the service brake system should be performed. Such an activation element is coupled to the system control unit 110 and can be for example configured as a pushbutton or switch. The pushbutton or switch is located in the operator cab 108, for example coupled to the communication panel and/or within a dashboard of the vehicle 100 so that the operator has easy access to the pushbutton or switch. According to this embodiment, instead of disabling the test process for the service brake system, the test process would be enabled by the operator. If not enabled, the system and component check of the vehicle 100 is configured such that it is performed without the check of the service brake system. In a further development, the operator may be prompted using the system control unit 110 to issue the test command to the system control unit to perform the check of the second set of components. For example, the activation element may be configured in form of software presented on the display of the communication panel after the system control unit 110 is activated and software initialized. For example, the communication panel may provide a question to the operator, for example "Enable Service Brake System Check?" along with icons "Yes" and "No", wherein the operator can select one of the icons "Yes" or "No".

Once the system control unit 110 is powered on and initialized, the system and component check starts. The service brake system verification/test, if selected, either not disabled/deactivated or enabled, is automatically incorporated into the system and component check. If the service brake system test is deactivated or not enabled, the system and component check is performed without the service brake system test.

The method as shown in FIG. 3 describes a system and component check, wherein a plurality of system and component checks is performed. Those skilled in the art would appreciate different component checks are available depending for example on a configuration of the vehicle 100. At block 304, component A, for example gate unit power, is checked. If check is successful, component B, for example inverter modules/crowbar, is checked at block 306. If check of component B is successful, component C, for example trolley components, is checked at block 308. Those skilled in the art would appreciate that many other components may be checked, for example DC bus voltage, and a cooling system of the vehicle 100. If tests of components have failed (not successful), i.e. the components are not operational and functioning, the tests may be repeated. If the components are still not functioning after tests have been repeated, those components have to be repaired or replaced.

After components A, B, C etc. are checked and tests have been successful, the method continues and status of the parking brake of the vehicle 100 is checked in order to verify that the parking brake is released (block 310).

Depending on whether a verification of the service brakes is disabled or not (block 312), a status of the service brake system of the vehicle 100 is checked. In order to perform the service brake system test, the service brakes of the service brake system must be set. When the service brakes are set, the test is performed (block 314). If the service brakes are not set, the system control unit 110 can be used to control the solenoid that will set the service brakes automatically. Once the service brakes are set, a predetermined force (torque) is applied against the service brakes using the wheel motors 102, 104, which can be for example electric traction motors. The predetermined force (torque) is selected such that the wheel motors 102, 104 do not rotate and the vehicle 100 does not move. For example, the predetermined torque may be equal to the maximum torque that the service brakes are specified to hold, plus a margin of safety. While the predetermined force (torque) is being applied, speeds of the wheel motors 102, 104 coupled to the service brakes are monitored for movement.

If rotation of the wheel motors 102, 104 is detected, the service brake test fails (block 316) and the predetermined force/torque is removed and propel of the vehicle 100 is inhibited (block 318). Additionally, if the service brake test fails, the system control unit 110, for example via the communication panel, may prompt the operator to set the parking brake, for example in form of a command such as "Service brake test failed—Please set parking brake" presented on the display of the communication panel (block 320). Optionally, the parking brake may be set automatically (block 320). In the exemplary embodiment of the method as shown in FIG. 3, the test process for verification of the service brakes may be repeated. Another failure of the test of the service brakes indicates that the service brakes need to be repaired, serviced or replaced. The predetermined force/torque that caused motor movement may be recorded and stored within the one or more memories of the system control unit 110.

If no wheel motor movement is detected, the service brake test is successful, i.e. passes (block 316), and the vehicle 100 is ready for propel (block 322). The system control unit 110, for example using the communication panel configured as a HMI device, indicates that the vehicle 100 is ready for propel, for example via a system ready light. Optionally, a corresponding message such as "Service brake test passed" may be displayed on the communication panel/HMI device of the system control unit 110. Block 324 indicates the end of the system and component check of the vehicle 100.

In an alternative embodiment, the test process for verifying the service brakes may be configured such that limits for passing and/or failing the test may be set via configurable warning and/or alarm levels. For example, a threshold value for a speed of a wheel motor 102, 104 may be predetermined.

Propel mode, for example drive mode, of the vehicle 100 is prohibited if a monitored speed of one or more of the wheel motors 102, 104 is above the threshold value within a predetermined time interval after the predetermined force (torque) has been applied by the wheel motors 102, 104 against the at least one service brake device. Additionally, the predetermined force (torque) is removed. The monitored speed of the wheel motor is recorded and stored in a memory device of the system control unit 110. A warning message, such as for example "Service brake test failed—Motor movement above threshold", may be issued to the operator using the system control unit 110 indicating that the speed of one or more wheel motors 102, 104 is above the predetermined threshold value.

Drive mode of the vehicle 100 is permitted if the monitored speed of the wheel motor is below the threshold value within a predetermined time interval after the predetermined force (torque) has been applied by the wheel motors 102, 104 against the at least one service brake device. In another exemplary embodiment, an alarm level may indicate to the operator that the service brakes do not hold a minimum torque safety level and propel would be inhibited. Such a monitored torque would also be recorded and stored within the system control unit 110 for later use. As described before, results of tests can be communicated to the operator via a system ready light or text and/or icons displayed on the HMI of the system control unit 110.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

We claim:

1. A method for checking sets of components of a vehicle, the method comprising:
configuring a system control unit of a vehicle to perform a check of a first set of components and a second set of components of the vehicle, the first set of components being different from the second set of components;
automatically checking the first set of components using the system control unit; and
automatically checking the second set of components using the system control unit, wherein the system control unit is configured to perform a check of the second set of components automatically unless the check is disabled based upon a disable command provided to the system control unit,
wherein the second set of components comprises at least one service brake device of the vehicle,
wherein the checking of the at least one service brake device comprises:
predetermining a threshold value for a speed of a traction motor;
applying the at least one service brake device to the traction motor;
applying a predetermined force (torque) by the traction motor against the at least one service brake device; and
monitoring the speed of the traction motor while the predetermined force (torque) is applied.

2. The method as claimed in claim 1, further comprising:
providing a deactivation element to disable the check of the second set of components, the deactivation element comprising a hardware element.

3. The method as claimed in claim 2, wherein the hardware element is a push button or switch activated by an operator.

4. The method as claimed in claim 1, further comprising:
providing a deactivation element to disable the check of the second set of components, wherein the deactivation element comprises a software element using the system control unit.

5. The method as claimed in claim 1, wherein the first set of components comprises at least one component of a drive system of the vehicle.

6. The method as claimed in claim 1, wherein the checking of the at least one service brake device comprises:
applying the at least one service brake device to a traction motor;
applying a predetermined force (torque) by the traction motor;
monitoring movement of the traction motor while the predetermined force (torque) is applied; and evaluating the movement of the traction motor, wherein drive mode of the vehicle is prohibited when movement of the traction motor is detected.

7. The method as claimed in claim 1 further comprising:
prohibiting drive mode of the vehicle if a monitored speed of the traction motor is above the threshold value within a predetermined time interval after the predetermined force (torque) has been applied by the traction motor against the at least one service brake device; and removing the predetermined force (torque).

8. The method as claimed in claim 1 further comprising:
permitting drive mode of the vehicle if the monitored speed of the traction motor is below the threshold value within a predetermined time interval after the predetermined force (torque) has been applied by the traction motor against the at least one service brake device, and if the check of the first set of components has passed.

9. The method as claimed in claim 7 further comprising:
recording and storing the monitored speed of the traction motor in a memory device of the system control unit.

10. The method as claimed in claim 7 further comprising:
issuing a warning message to the operator using the system control unit that the speed of the traction motor is above the predetermined threshold value.

11. A system for verifying different sets of components in a vehicle comprising:
a system control unit configured to perform a check of a first set of components and a second set of components of a vehicle, the first set of components being different from the second set of components;
at least one deactivation element operably connected to the system control unit to disable the check of the second set of components,
wherein the first set of components is automatically checked using the system control unit, and wherein the second set of components is automatically checked unless optionally disabled via the at least one deactivation element,
wherein the second set of components comprises at least one service brake device of the vehicle, wherein checking of the at least one service brake device comprises:
predetermining a threshold value for a speed of a traction motor;
applying the at least one service brake device to the traction motor;
applying a predetermined force (torque) by the traction motor against the at least one service brake device; and
monitoring the speed of the traction motor while the predetermined force (torque) is applied.

12. The system as claimed in claim 11, wherein the second set of components comprises a plurality of service brakes.

13. The system as claimed in claim 11, wherein the vehicle is a mining haul truck.

14. The system as claimed in claim 11, wherein the at least one deactivation element comprises a push button or switch operably connected to the system control unit.

15. A method for checking sets of components of a vehicle, the method comprising:
configuring a system control unit of a vehicle to perform a check of a first set of components and a second set of components of the vehicle, the first set of components being different from the second set of components;
automatically checking the first set of components using the system control unit;
issuing a test command by an operator to the system control unit to perform a check of the second set of components of the vehicle; and
checking the second set of components of the vehicle in response to the test command using the system control unit, wherein the second set of components comprises at least one service brake device of the vehicle, wherein the checking of the at least one service brake device comprises:
predetermining a threshold value for a speed of a traction motor;
applying the at least one service brake device to the traction motor;
applying a predetermined force (torque) by the traction motor against the at least one service brake device; and
monitoring the speed of the traction motor while the predetermined force (torque) is applied.

16. The method as claimed in claim 15, further comprising:
prompting an operator of the vehicle to issue the test command to the system control unit to perform the check of the second set of components.

17. The method as claimed in claim 15, wherein the first set of components comprises at least one component of a drive system of the vehicle.

18. The method as claimed in claim 15, further comprising:
prohibiting drive mode of the vehicle if a monitored speed of the traction motor is above the threshold value within a predetermined time interval after the predetermined force (torque) has been applied by the traction motor against the at least one service brake device; and removing the predetermined force (torque).

19. The method as claimed in claim 15, further comprising:
permitting drive mode of the vehicle if the monitored speed of the traction motor is below the threshold value within a predetermined time interval after the predetermined force (torque) has been applied by the traction motor against the at least one service brake device, and if the check of the first set of components has passed.

20. The method as claimed in claim 18, further comprising:
recording and storing the monitored speed of the traction motor in a memory device of the system control unit.

* * * * *